Nov. 1, 1955 G. HERZOG 2,722,610
PROSPECTING
Original Filed March 9, 1948 2 Sheets-Sheet 1

INVENTOR.
GERHARD HERZOG
BY
Daniel Stryker
ATTORNEY

Nov. 1, 1955  G. HERZOG  2,722,610
PROSPECTING
Original Filed March 9, 1948  2 Sheets-Sheet 2
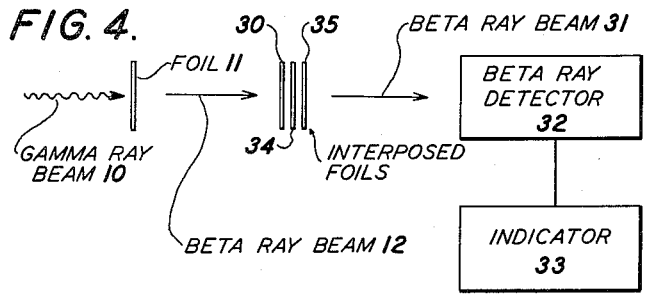
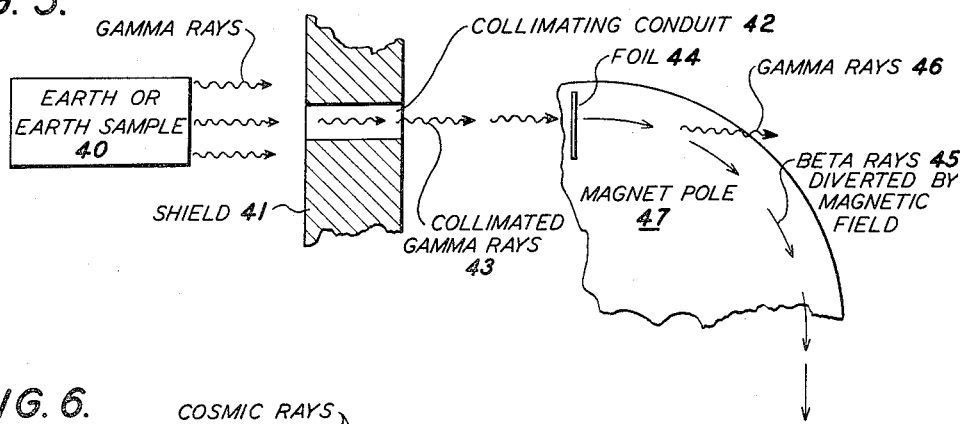
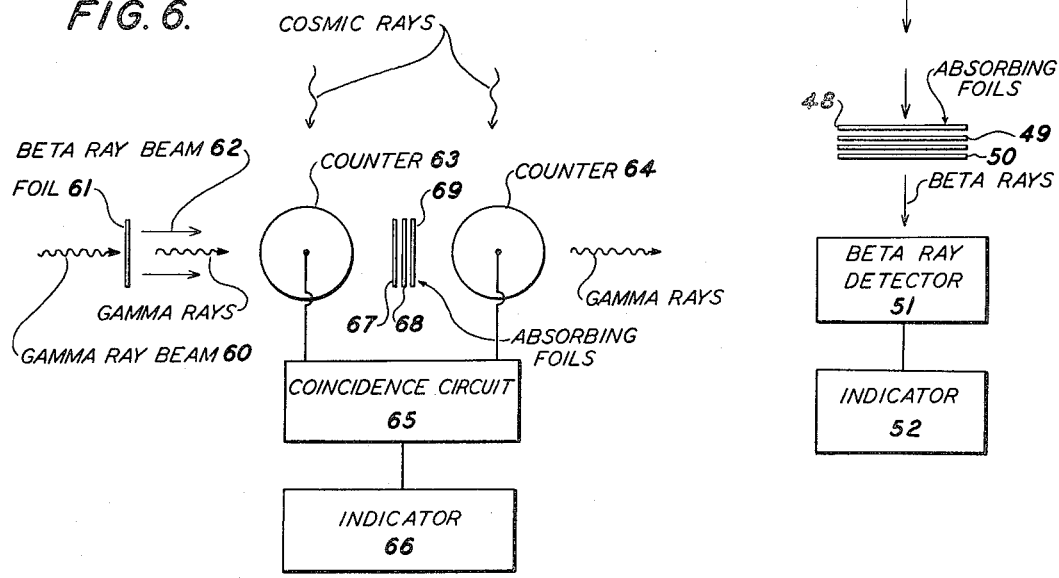
INVENTOR.
GERHARD HERZOG
BY
*Daniel Stryker*
ATTORNEY

United States Patent Office 2,722,610
Patented Nov. 1, 1955

2,722,610

PROSPECTING

Gerhard Herzog, Houston, Tex., assignor to The Texas Company, New York, N. Y., a corporation of Delaware Original application March 9, 1948, Serial No. 13,847. Divided and this application June 23, 1951, Serial No. 233,209

5 Claims. (Cl. 250—83.6)

This invention is concerned with geophysical prospecting, and particularly with prospecting operations involving the detection and measurement of gamma rays emitted by the earth or by earth samples. The invention finds application in the location of mineral deposits, but is of general utility in distinguishing between geological formations and in locating faults, contacts and other structural features of the earth. Thus it is useful in gamma ray logging of wells in oil field practice, in surface surveys made above ground for geological mapping purposes, and in underground surveys of mine workings.

This application is a division of my co-pending application Serial No. 13,847, filed March 9, 1948 (now Patent No. 2,563,333, granted on August 7, 1951.

As disclosed in my co-pending application Serial No. 13,847, filed March 9, 1948, deeply buried mineral deposits may be located by surveys of gamma ray intensities along traverses that are so far removed from the deposit that gamma radiation, if any, originating in the deposit itself is substantially completely absorbed in the overburden and makes no contribution to the intensity of gamma rays detected along the traverse. The deposit itself need not be radioactive and frequently is not, for the gamma rays which are detected and reveal the deposit appear to originate in an "aura" in the country rock or overburden. The process is primarily applicable to the discovery of deposits of minerals of non-radioactive metals, such as iron, copper, lead, zinc, gold, etc. By measuring gamma ray intensities at a number of spaced points along the traverse in the neighborhood of the deposit with sufficient accuracy, a radioactive anomaly which is a manifestation of the aura may be revealed, thus indirectly disclosing the presence of the mineral deposit. This anomaly may be either positive, in which case the intensity of gamma rays emitted by the country rock increases as the deposit is approached, or negative, in which case the intensity of gamma rays emitted by successive portions of the overburden decreases in the direction of the deposit. Such anomalies may be detected in accordance with the invention of my aforementioned application by measuring intensities of the rock or overburden in place, or as disclosed in co-pending application Serial No. 13,845, filed March 9, 1948, by Herzog, Stratford and Teichmann (now Patent No. 2,562,961, granted on August 7, 1951), such anomalies may be detected by taking samples of rock from different points in the country rock, and accurately determining the intensity of gamma rays emitted by the samples after their isolation from the mass in which they occur.

In accordance with the instant invention, which may be employed alone or in conjunction with the methods of the aforementioned copending applications, the spectrum of the gamma radiation emitted by rocks or rock samples is investigated. Thus, the spectra of gamma radiation emitted at a series of locations along an earth surface, either above or underground, may be analyzed, or a series of samples may be taken at these locations and the gamma ray spectra of the several samples subjected to analysis with the samples removed from the main mass and preferably isolated in a space in which "back ground" radiation (i. e. that emitted by other than the sample) is as low and as uniform as practical.

Gamma radiation consists of electromagnetic waves, identical in nature to very penetrating X-rays. Gamma rays are emitted with different individual energies, i. e. wave length, and each radioactive substance has a characteristic gamma ray spectrum composed of gamma radiation of various wave lengths (energies). Hereinafter gamma ray beams are referred to as "monochromatic" when they consist of rays of a single energy and as "polychromatic," when they consist of rays of different energies.

In the practice of the invention (say to distinguish between the gamma spectra emitted by two different rock formations, and thereby establish the line of contact between them (beta radiation is produced from gamma radiation, say by permitting the gamma radiation to impinge on a thin metal foil, and the energy distribution of the beta radiation thus produced is investigated. These and other aspects of my invention will be more thoroughly understood in the light of the following detailed description, taken in conjunction with the accompanying drawings in which:

Fig 4 is a diagram illustrating another means of analysis of energy of beta radiation derived from gamma radiation which is the real subject of investigation;

Fig. 5 illustrates an improved form of the apparatus of Fig. 4; and

Fig. 6 illustrates a further modification of the apparatus of Fig. 4 employing a coincidence circuit.

Figure 1:
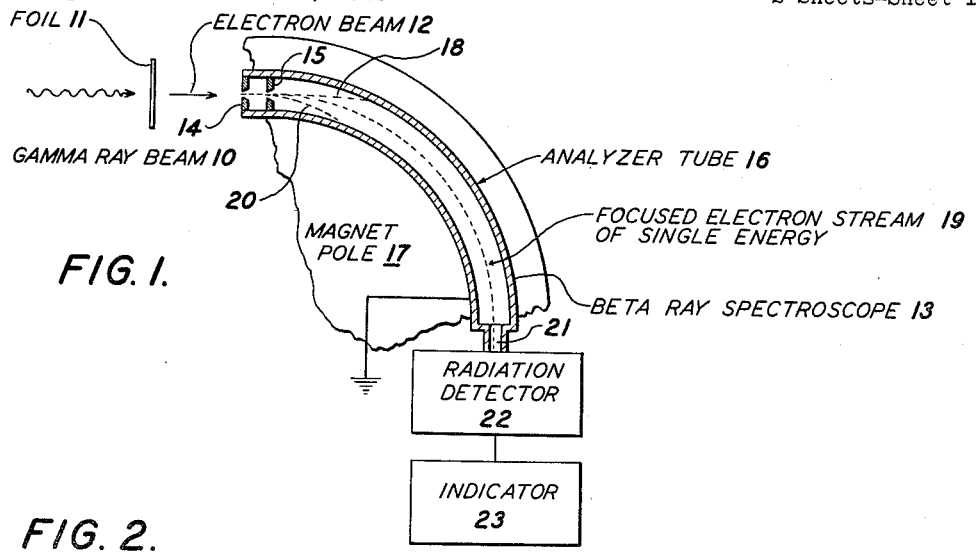
Fig. 1 is a diagram illustrating a practice of the invention employing a beta ray spectrometer to analyze indirectly a gamma ray spectrum.

Referring to Fig. 1, a "polychromatic" gamma ray beam 10 (i. e. a beam having rays of different energies) from an earth mass or an earth sample is caused to impinge on a thin metal foil 11 which thereupon emits an electron beam 12. This electron or beta ray beam is directed into a beta ray spectroscope 13 of conventional design, equipped with collimating plates 14, 15 having slits through which the electron beam enters an analyzer chamber or tube 16. This chamber is disposed between the poles of an electromagnet, one pole 17, being shown. The magnetic lines of force are perpendicular to the plane of the drawing. Under the influence of the magnetic field the electrons of the beam are caused to pursue curved paths 18, 19, 20, the radii of curvature being dependent upon the energy of the electrons and the strength of the magnetic field. By changing the field force, for example by changing the energization of the electromagnet, streams of electrons having different energies may be focused successively on an outlet 21 at the end of the analyzer tube and thus pass to a radiation detection apparatus 22, for example a conventional Geiger-Mueller counter, equipped with means 23 for indicating the abundance of the electrons in the stream focused on the outlet. The unfocused streams, say the streams 18, 20, strike the wall of the analyzer and are grounded. Each stream of electrons is composed of electrons of the same energy and each may be focused on the outlet until a fixed number of pulses, say 1000, has been registered by the detection apparatus, the time for this count being accurately determined. The number of counts divided by the time is a measure of the abundance or intensity of electrons of a given energy. The operation is repeated with a series of different magnetic field strengths, so as to bring into focus a corresponding series of electron streams, each of a different energy, and in this way the intensity of the electrons of each energy is determined.

Figure 2:
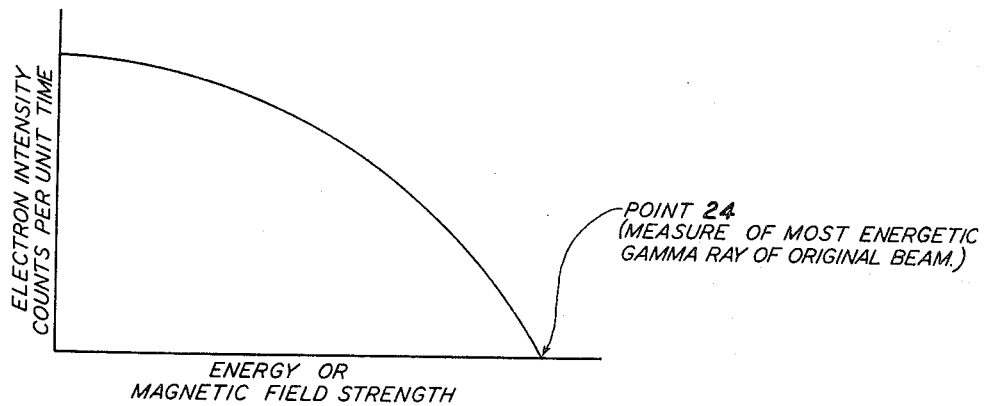
Fig. 2 is a graph of intensity against energy derived in the operation of the apparatus of Fig. 1.

Fig. 2 is a plot of the results of a spectrum analysis conducted as described above with energy (of which magnetic field strength is a measure) plotted as abscissa and abundance, or electrons detected per unit time (intensity) as ordinate.

Assuming no loss of energy except binding energy in the production of electrons by the gamma ray beam, i. e. a very thin foil 11, the curve of Fig. 2 would represent the actual spectrum, i. e. energy distribution of the gamma ray beam being analyzed. However, with foils of presently obtainable thickness, a given gamma ray may produce an electron which, after emergence from the foil, can have any energy from zero to the maximum indicated by the curve at the point 24 where it strikes the abscissa. The end point 24, however, is always a measure of the energy of the hardest gamma ray contained in the original "polychromatic" beam, and the shape of the curve obtained in the spectrum analysis conducted as described above may be used to compare energy distribution in two different gamma ray beams.

Figure 3:
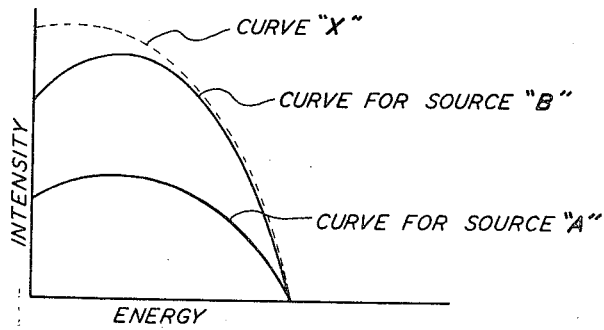
Fig. 3 is a graph similar to Fig. 2 showing several types of curves derived with the apparatus of Fig. 1.

To take a simple case of comparison, two similar sources of radiation, one twice the size of the other will give two curves with the same endpoint and the same shape, except that the curve representative of the bigger source will have twice the amplitude of the curve representative of the other source. This is illustrated by Fig. 3 upon which have been plotted the curves for two sources A and B, the source B being twice as powerful as A but with the same energy distribution. Any deviation from the relationship of the two curves as expressed above would mean that the two sources had different spectra. In other words, by comparing the shape of the curves produced from the results of analyses with the apparatus of Fig. 1 of two different rock samples, it is possible to determine qualitatively which sample emits the highest proportion of soft rays, and by mathematical analysis it is possible to compare the two spectra quantitatively. The curve X on Fig. 3 is representative of a gamma ray beam having a higher proportion of "soft" rays, i. e. rays of low energy, than the gamma ray beams from sources A and B.

In accordance with the invention, a series of rock samples may be taken at spaced known locations along a traverse being investigated, say along a crosscut in a mine or above ground along a surface below which it is suspected that an ore body occurs. Each sample is reduced to equal size after crushing and each is then subjected to spectrum analysis with the apparatus of Fig. 1, i. e. by employing the gamma radiation to produce beta radiation, and subjecting the beam of beta radiation to spectroscopic analysis. Alternatively, the apparatus may be move from one location to another along the traverse and the spectra of the gamma radiation emitted from the earth at each location investigated. In either case, a difference in spectra from sample to sample or from location to location may be significant in determining the presence of a radioactive anomaly which could not be detected by a comparison of the intensity of gamma rays emitted by the several samples or from the several locations.

The apparatus of Fig. 4 illustrates another system for investigating the energy distribution of a gamma ray beam emitted by an earth formation or earth sample. As in the case of Fig. 1, the polychromatic gamma ray beam 10 to be investigated is caused to impinge on the thin foil 11 with resultant emission of a beta ray beam 12 (electrons). The electron beam in turn impinges on another thin foil 30 which has sufficient absorptive power to stop electrons of relatively low energy, but permitting beta rays of greater penetration (energy) to pass through as a beam 31 to a detector 32 sensitive to beta radiation, say a Geiger-Mueller counter, the response of which is registered by a conventional indicating means 33. The intensity of the beta radiation thus detected is determined in terms of counts of the detector per unit time. The operation is repeated with an additional foil 34 interposed in the path of the beta rays and again with a third foil 35 interposed. Additional foils are added to the stack until the beta radiation is substantially blocked. The total foil thickness for each determination of beta ray intensity is then plotted against the intensity corresponding to that thickness. Foil thickness in this case is a measure of energy, so that if it is plotted as abscissa with intensity or ordinate a curve generally similar to that of Fig. 2 is obtained. This curve may be interpreted in the same ways at Figs. 2 and 3. Thus gamma rays beams may be compared with respect to energy distribution.

The interposed foils in the apparatus of Fig. 4 must be shielded or otherwise protected from the gamma ray beam, which otherwise will produce new electrons by impingement on these foils and vitiate spectrum determination. One means for protecting the foils from this gamma radiation is illustrated in Fig. 5, wherein gamma rays from an earth mass or earth sample 40 impinge on a shield 41 of lead having an orifice or collimating conduit 42 through which a gamma ray beam 43 passes. A thin foil 44 is disposed in the path of the collimated gamma ray beam, which impinges on the foil and produces a stream 45 of electrons (beta radiation). Some gamma rays 46 are not converted to beta radiation and these continue beyond the foil in the general direction determined by the collimating conduit. The stream of electrons is diverted from this direction by a magnetic field the lines of force of which are perpendicular to the plane of the paper and are produced by a magnet, one pole 47 of which is shown. The electrons thus pursue a curved path which carries them to the stack of absorbing foils 48, 49, 50. Those electrons passing through the absorbing foils are intercepted by a conventional beta ray detector 51 equipped with a conventional indicator 52, which registers the intensity of the detected radiation, i. e. the counts per unit time.

The operation of the apparatus of Fig. 5 is the same as that of Fig. 4, and a similar plot of foil thickness against intensity may be obtained.

Another apparatus for avoiding the effect of new electrons produced by impingement of gamma radiation on the absorption foils is shown schematically in Fig. 6, wherein a gamma ray beam 60 emitted by a rock formation after collimation impinges on a thin foil 61 with resultant emission of beta rays 62. The beta radiation thus formed, together with unconverted gamma radiation passes as a beam which is intercepted by a pair of beta ray counters 63, 64 such as Geiger-Mueller detectors. These counters are connected together through a conventional coincidence circuit 65, which may include amplifiers etc., in addition to the coincidence ciruit proper. Such circuits are known and are disclosed for example at page 44 of "Radioactivity and Nuclear Physics" by Cork (Van Nostrand 1947). The output of the coincidence circuit is connected to conventional indicating or recording means 66. The construction of the coincidence circuit is such that only those individual rays are counted which are detected simultaneously by both counters.

A set of absorber foils 67, 68, 69 is interposed between the two counters one after another to increase foil thickness in steps, just as in the apparatus of Figs. 4 or 5.

The operation of the apparatus of Fig. 6 is as follows:

The thickness of absorbing foil is increased progressively and after each increase the registered beta ray intensity, as determined by the coincidence arrangement, is measured, for example in terms of counts or pulses per minute. Foil thickness is plotted against corresponding intensity to produce a curve similar to that of Fig. 2, the interpretation of the results represented by the curve or curves being made as described in relation to Figs. 1, 2 and 3.

Gamma radiation, even though it passes through the foil 61 to the beta ray detectors and the absorbing foils does not vitiate the results obtained through production of new electrons in the absorbing foils. Such a new electron, if it passes to the counter 64, produces a count which is not accompanied by a simultaneous count of the counter 63 and so is not registered. Should the new electron from the absorbing foil be reflected and detected by the counter 63 it will not register since the two counters do not trip simultaneously. If an original electron from the foil 61 is stopped by the absorbing foils it may be detected by the near counter 63 but will not be detected by the far counter 64. Consequently the only electrons which are registered are original ones from the foil 61 which are detected by the near counter, pass through the absorbing foil or foils and are detected by the far counter. As absorbing foil thickness is increased the abundance of such electrons decreases and the registered intensity drops.

The apparatus of Fig. 6 has another advantage in that it eliminates the effects of cosmic ray components, say penetrating particles such as mesotrons, against which it is impractical to shield the detectors or counters. Assuming that the cosmic radiation is directed from above in Fig. 6, which is easily arranged by proper orientation of the instrument, a penetrating particle which trips one counter will not trip the other and so, by reason of the coincidence circuit, will not be registered.

I claim:

1. The method of prospecting which comprises measuring substantially the total intensity of natural gamma rays emitted from earth formations of certain locations along the earth, measuring the energy distribution of the natural gamma rays from each of the earth formations by producing beta rays from the natural gamma rays and by measuring the distribution of energy in the beta rays so produced, and providing a comparison of the distribution of energy from the formations of the various locations to establish a correllation between earth formations having substantially the same energy distribution and to establish a line of contact between earth formations having different energy distributions.

2. The method of prospecting which comprises obtaining samples of earth formations from a plurality of locations to be investigated, reducing the respective samples to approximately the same size, measuring the total intensity of natural gamma rays emitted from each sample, providing a measure of the energy distribution of the natural gamma rays emitted from each sample by producing beta rays from the natural gamma rays, measuring the intensity of the beta rays of certain energies so produced, and providing a comparison of the distribution of energy from the samples from various locations to establish a correlation between earth formations having substantially the same energy distribution and to establish a line of contact between earth formations having different energy distributions.

3. The method of prospecting which comprises providing a measure of the energy distribution of the natural gamma rays emitted from earth formations of certain locations along the earth by causing the gamma ray beam to impinge upon a thin foil to produce beta rays, measuring the energy spectrum of the beta rays so produced by applying a magnetic field to the beta rays to cause angular separation of the beta rays of different energies and measuring the intensity of the beta rays of various energies, and providing a display of the energy spectra from the formations of the various locations to establish a correlation between earth formations having substantially the same energy spectrum and to establish a line of contact between earth formations having different energy spectra.

4. The method of prospecting which comprises providing a measure of the energy distribution of the natural gamma rays emitted from earth formations of certain locations along the earth by collimating the natural gamma rays emitted from each earth formation to form a polychromatic gamma ray beam, causing the collimated gamma ray beam to impinge upon a thin foil to produce beta rays, measuring the distribution of energy in the beta rays so produced by selective absorption, and providing a comparison of the distribution of energy from the formations of the various locations to establish a correlation between earth formations having substantially the same energy distribution and to establish a line of contact between earth formations having different energy distributions.

5. The method of prospecting which comprises providing a measure of the energy distribution of the natural gamma rays emitted from earth formations of certain locations along the earth by collimating the natural gamma rays emitted from each earth formation to form a polychromatic gamma ray beam, causing the collimated gamma ray beam to impinge upon a thin foil so that beta rays are produced which mingle with the gamma rays to form a beam of mixed gamma and beta radiation, separating the beta rays from the gamma rays by applying a magnetic field to the beam of mixed gamma and beta radiation, measuring the distribution of energy in the beta rays so separated by selective absorption, and providing a comparison of the distribution of energy from the formations of the various locations to establish a correlation between earth formations having substantially the same energy distribution and to establish a line of contact between earth formations having different energy distributions.

References Cited in the file of this patent

Studies of Capture of Gamma Rays, Dancoff et al. MDDC–935, May 8, 1947, pages 1–6.

Introduction to Modern Physics, Richtmyer et al. Pages 565–571, 1947; publ. by McGraw-Hill Book Co. Inc., 4th ed., 2nd printing, New York, N. Y.

Geophysical Exploration, Heiland; Prentice-Hall, 1940, pgs. 873–885.